United States Patent
Glahn et al.

(10) Patent No.: US 8,997,500 B2
(45) Date of Patent: Apr. 7, 2015

(54) GAS TURBINE ENGINE OIL BUFFERING

(75) Inventors: Jorn A. Glahn, Manchester, CT (US); Frederick M. Schwarz, Glastonbury, CT (US)

(73) Assignee: United Technologies Corporation, Hartford, CT (US)

(*) Notice: Subject to any disclaimer, the term of this patent is extended or adjusted under 35 U.S.C. 154(b) by 571 days.

(21) Appl. No.: 13/340,871

(22) Filed: Dec. 30, 2011

(65) Prior Publication Data

US 2013/0094937 A1  Apr. 18, 2013

Related U.S. Application Data

(63) Continuation-in-part of application No. 12/708,621, filed on Feb. 19, 2010, now Pat. No. 8,516,828.

(51) Int. Cl.
| | |
|---|---|
| F02C 6/04 | (2006.01) |
| F01D 15/12 | (2006.01) |
| F02C 6/08 | (2006.01) |
| F02C 7/32 | (2006.01) |
| F01D 25/18 | (2006.01) |

(52) U.S. Cl.
CPC . F01D 15/12 (2013.01); F02C 6/08 (2013.01); F02C 7/32 (2013.01); Y02T 50/671 (2013.01); F01D 25/183 (2013.01)

(58) Field of Classification Search
CPC .............. F02C 7/32; F02C 7/36; F02C 7/28; F02C 6/08; F02C 6/06; F01D 25/125; F01D 25/16
USPC .......... 60/39.83, 782, 785, 802, 39.73, 39.08, 60/806; 244/58; 184/6.11
See application file for complete search history.

(56) References Cited

U.S. PATENT DOCUMENTS

| | | | | |
|---|---|---|---|---|
| 3,527,054 | A * | 9/1970 | Hemsworth | 60/39.08 |
| 3,577,965 | A | 5/1971 | Sundberg | |
| 3,747,343 | A * | 7/1973 | Rosen | 60/226.1 |
| 4,542,623 | A * | 9/1985 | Hovan et al. | 60/226.1 |
| 4,653,267 | A * | 3/1987 | Brodell et al. | 60/782 |
| 5,039,281 | A | 8/1991 | Johnston | |
| 5,081,832 | A | 1/1992 | Mowill | |
| 5,143,329 | A | 9/1992 | Coffinberry | |
| 5,619,850 | A | 4/1997 | Palmer et al. | |
| 6,513,335 | B2 | 2/2003 | Fukutani | |
| 6,647,730 | B2 | 11/2003 | Liu | |

(Continued)

FOREIGN PATENT DOCUMENTS

DE  102009003408 A1  8/2009

OTHER PUBLICATIONS

International Search Report and Written Opinion for International Application No. PCT/US2012/071815 mailed Aug. 30, 2013.

(Continued)

*Primary Examiner* — Phutthiwat Wongwian
*Assistant Examiner* — Steven Sutherland
(74) *Attorney, Agent, or Firm* — Carlson, Gaskey & Olds, P.C.

(57) ABSTRACT

A turbine engine includes a shaft, a fan, at least one bearing mounted on the shaft and rotationally supporting the fan, a fan drive gear system coupled to drive the fan, a bearing compartment around the at least one bearing and a source of pressurized air in communication with a region outside of the bearing compartment.

20 Claims, 2 Drawing Sheets

(56) References Cited

U.S. PATENT DOCUMENTS

| | | |
|---|---|---|
| 6,968,701 B2 | 11/2005 | Glahn et al. |
| 7,021,042 B2 * | 4/2006 | Law .............................. 60/226.1 |
| 7,287,384 B2 | 10/2007 | Fish et al. |
| 7,377,110 B2 | 5/2008 | Sheridan et al. |
| 8,096,747 B2 | 1/2012 | Sengar et al. |
| 2003/0163984 A1 | 9/2003 | Seda et al. |
| 2003/0182944 A1 | 10/2003 | Hoffman et al. |
| 2006/0037302 A1 | 2/2006 | Peters et al. |
| 2006/0213202 A1 | 9/2006 | Fukutani |
| 2006/0260323 A1 | 11/2006 | Moulebhar |
| 2008/0134657 A1 * | 6/2008 | DiBenedetto et al. ....... 60/39.08 |
| 2008/0190095 A1 * | 8/2008 | Baran .......................... 60/226.3 |
| 2009/0081039 A1 | 3/2009 | McCune et al. |
| 2009/0090096 A1 | 4/2009 | Sheridan |
| 2010/0105516 A1 | 4/2010 | Sheridan et al. |

OTHER PUBLICATIONS

The Jul. 7, 2011 European Search Report for Counterpart European Application No. 11250168.

International Preliminary Report on Patentability for PCT Application No. PCT/US2012/071815 completed Jul. 10, 2014.

* cited by examiner

GAS TURBINE ENGINE OIL BUFFERING

CROSS REFERENCE TO RELATED APPLICATIONS

The present disclosure is a continuation in part of U.S. patent application Ser. No. 12/708,621, filed Feb. 19, 2010 now U.S. Pat. No. 8,516,828.

BACKGROUND OF THE INVENTION

The present invention relates generally to gas turbine engines, and more particularly, to a system for supplying buffer air and ventilation air to the bearing compartments and shaft(s) in gas turbine engines.

In typical multi-shaft bypass jet turbine engines, one shaft supports the rotors of a low pressure compressor and a low pressure turbine and another shaft supports the rotors of a high pressure compressor and a high pressure turbine. Generally, each of the shafts is supported by bearings, and each bearing is lubricated by a forced lubrication system which circulates lubricating oil fed by a pump.

In the forced lubricating system, high pressure air is drawn from the high pressure compressor and is conducted to the exterior of the oil seals of the bearing compartments to keep the interior of the bearing compartments at a lower pressure than its immediate surroundings. This pressure differential prevents the lubricating oil from leaking out of the bearing compartments. In particular, high pressure buffer air drawn from the high pressure compressor is utilized because at least one of the bearing compartments is located in a high pressure environment where buffer air from the low pressure compressor would not provide adequate compartment pressurization at low power engine operating conditions. Unfortunately, buffer air drawn from the high pressure compressor is excessively hot and requires cooling at higher power engine operating conditions. Therefore, a dedicated cooler is required to lower the temperature of the buffer air. This cooler adds additional weight to the engine and can be difficult to package especially in smaller engine models.

SUMMARY OF THE INVENTION

A disclosed example turbine engine according to an exemplary embodiment includes a shaft, a fan, at least one bearing mounted on the shaft and rotationally supporting the fan, a fan drive gear system coupled to drive the fan, a bearing compartment around the at least one bearing, and a source of pressurized air in communication with a region outside of the bearing compartment.

In a further embodiment of the foregoing turbine engine, the fan drive gear system includes an epicyclic gear train.

In a further embodiment of the foregoing turbine engine, the epicyclic gear train has a gear reduction ratio of greater than or equal to about 2.3.

In a further embodiment of the foregoing turbine engine, the turbine engine, the epicyclic gear train has a gear reduction ratio of greater than or equal to 2.3.

In a further embodiment of the foregoing turbine engine the epicyclic gear train has a gear reduction ratio of greater than or equal to about 2.5.

In a further embodiment of the foregoing turbine engine, the epicyclic gear train has a gear reduction ratio of greater than or equal to 2.5.

In a further embodiment of the foregoing turbine engine, the fan defines a bypass ratio of greater than about ten (10) with regard to a bypass airflow and a core airflow.

In a further embodiment of the foregoing turbine engine, the fan defines a bypass ratio of greater than 10.5:1 with regard to a bypass airflow and a core airflow.

In a further embodiment of the foregoing turbine engine, the fan defines a bypass ratio of greater than ten (10) with regard to a bypass airflow and a core airflow.

In a further embodiment of the foregoing turbine engine, the fan defines a pressure ratio that is less than about 1.45.

In a further embodiment of the foregoing turbine engine, the fan defines a pressure ratio that is less than 1.45.

In a further embodiment of the foregoing turbine engine, a core compressor section is the source of the pressurized air.

A disclosed method of operating a turbine engine that includes a shaft, a fan, at least one bearing mounted on the shaft and rotationally supporting the fan, a fan drive gear system coupled to drive the fan and a bearing compartment around the at least one bearing according to an exemplary embodiment includes the steps of providing pressurized air to a region outside of the bearing compartment to establish a positive pressure differential between the region outside of the bearing compartment and the interior of the bearing compartment.

In a further embodiment of the foregoing method the fan drive gear system includes an epicyclic gear train.

In a further embodiment of the foregoing method, the epicyclic gear train has a gear reduction ratio of greater than or equal to about 2.3.

In a further embodiment of the foregoing method, including the step of providing the pressurized air from a core compressor section.

Although different examples have the specific components shown in the illustrations, embodiments of this invention are not limited to those particular combinations. It is possible to use some of the components or features from one of the examples in combination with features or components of another of the examples.

These and other features disclosed herein can be best understood from the following specification and drawings, the following of which is a brief description.

DETAILED DESCRIPTION OF THE PREFERRED EMBODIMENT

The present application describes new pressurization and ventilation systems for bearing compartments and shafts of a gas turbine engine. In particular, the present application describes an assembly and a method for providing buffer and/or ventilation air to bearing compartments and/or shafts of a gas turbine engine. The gas turbine engine described includes a dedicated centrifugal compressor that compresses bleed air from a low pressure compressor section and/or a fan section of the gas turbine engine. The compressed air is delivered to the core of the engine to buffer the bearing compartments and/or ventilate one or more shafts. The centrifugal compressor compresses the bleed air to a higher pressure more efficiently than traditional axial compressor arrays because it avoids the loss of kinetic energy and the throttling losses at the compressor case that are experienced with traditional axial compressor arrays. By utilizing the centrifugal compressor, air is drawn from the fan section and/or the low pressure compressor section and compressed to a desired optimal pressure and temperature, thereby eliminating the need for cooling within a cooler. This arrangement also reduces the likelihood of an inadequately pressurized bearing compartment at low power engine operating conditions, discussed previously. The flow rate and pressure ratio requirements of the centrifugal compressor are low enough to allow for a compact design that can fit within various locations such as the engine core and allow the centrifugal compressor to be integrated as an accessory to be driven by the gearbox.

Figure 1:
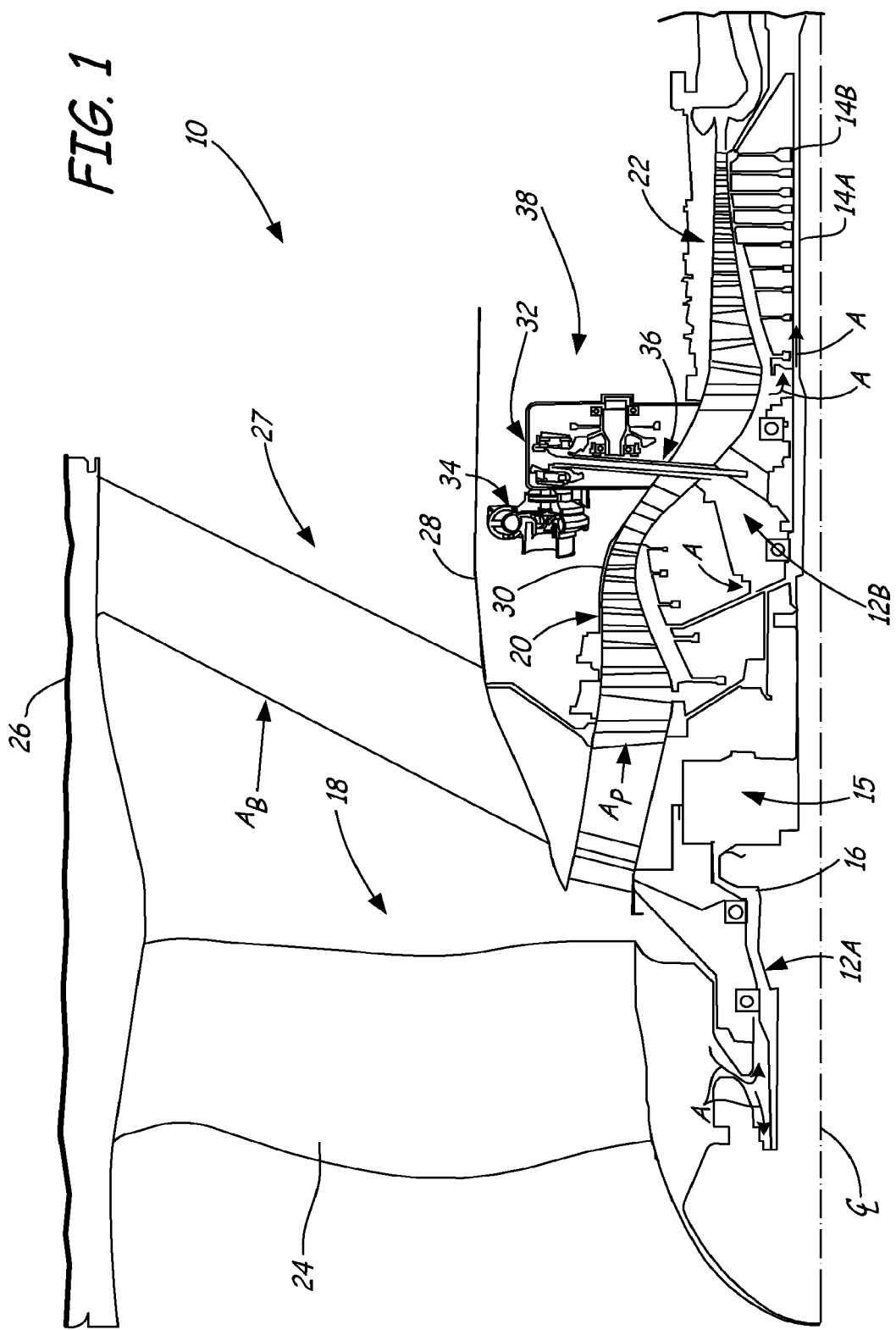
FIG. 1 is a schematic partial sectional view of a gas turbine engine with a centrifugal compressor driven by an accessory gearbox.

FIG. 1 shows a schematic partial cross section of a portion of a gas turbine engine 10. Gas turbine engine 10 has bearing compartments 12A and 12B which house anti-friction bearings that support shafts 14A and 14B. Gas turbine engine 10 is defined around an engine centerline CL about which various engine sections rotate. In FIG. 1, only a portion of gas turbine engine 10 including a rotor section 16, a fan section 18, a low pressure compressor (LPC) section 20, and a high pressure compressor (HPC) section 22 is illustrated. Gas turbine engine 10 is illustrated as a high bypass ratio turbofan engine with a dual spool arrangement in which fan section 18 and LPC 20 are connected to a low pressure turbine section (not shown) by rotor 16, fan drive gear system 15, and shaft 14A, and high pressure compressor section 22 is connected to a high pressure turbine section (not shown) by second shaft 14B. The general construction and operation of gas turbine engines, and in particular turbofan engines, is well-known in the art, and therefore, detailed discussion herein is unnecessary. It should be noted, however, that engine 10 is shown in FIG. 1 merely by way of example and not limitation. The present invention is also applicable to a variety of other gas turbine engine configurations, such as a turbofan engine without fan-drive gear system and a turboprop engine, for example.

In one example, the gas turbine engine 10 is a high-bypass geared architecture aircraft engine. In one disclosed, non-limiting embodiment, the engine 10 has a bypass ratio that is greater than about six (6) to ten (10), the fan drive gear system 15 is epicyclic gear train and includes a planetary gear system or other gear system with a gear reduction ratio of greater than about 2.3 or greater than about 2.5, and a low pressure turbine of the engine 10 has a pressure ratio that is greater than about 5. In one disclosed embodiment, the engine 10 bypass ratio is greater than about ten (10:1) or greater than about 10.5:1, the a fan rotor 24 diameter is significantly larger than that of the low pressure compressor of the compressor section 20/22, and the low pressure turbine has a pressure ratio that is greater than about 5:1. In one example, the epicyclic gear train has a gear reduction ratio of greater than about 2.3:1 or greater than about 2.5:1. It should be understood, however, that the above parameters are only exemplary of one embodiment of a geared architecture engine and that the present invention is applicable to other gas turbine engines including direct drive turbofans.

A significant amount of thrust is provided by a bypass flow B due to the high bypass ratio. The fan of the engine 10 is designed for a particular flight condition—typically cruise at about 0.8M and about 35,000 feet. The flight condition of 0.8 M and 35,000 ft, with the engine at its best fuel consumption—also known as "bucket cruise TSFC"—is the industry standard parameter of 1 bm of fuel being burned divided by 1 bf of thrust the engine produces at that minimum point. "Low fan pressure ratio" is the pressure ratio across the fan blade alone. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)ˆ0.5]. The "Low corrected fan tip speed" as disclosed herein according to one non-limiting embodiment is less than about 1150 ft/second.

In addition to fan section 18, low pressure compressor section 20, and high pressure compressor section 22, gas turbine engine 10 includes a fan rotor 24, an outer case 26, a bypass duct 27, an inner fan case 28, an intermediate case 30, an accessory gearbox 32, a centrifugal compressor 34, and a radial drive shaft 36. Inner fan duct 28 and intermediate case 30 define a core compartment 38.

Air enters fan section 18 of turbine engine 10 where it is divided into streams of primary air Ar and bypass air AB after passing through the fan 24. Bypass air AB flows inside outer case 26 and along inner fan case 28 and eventually exits bypass duct 27 and engine 10. The fan 24 is disposed radially inward of outer case 26 and is rotated by the low pressure turbine (not shown) through the shaft 14 and fan-drive gear system 15 to accelerate the bypass air AB through fan section 18, thereby producing a significant portion of the thrust output of engine 10.

The primary air Ar (also known as gas path air) is directed first through the low pressure compressor section 20 (which is partially bounded by intermediate case 30) and then through high pressure compressor section 22. As illustrated in FIG. 1, accessory gearbox 32 is connected to intermediate case 30 and extends radially outward of engine centerline CL away from low pressure compressor section 20. As is known in the art, the location of accessory gearbox 32 in FIG. 1 is by way of example and not limitation. In other embodiments, accessory gearbox 32 can be disposed on outer case 26, inner fan case 28 or in other locations including within the core of the gas turbine engine 10. Accessory gearbox 32 is connected to and drives centrifugal compressor 34. More particularly, accessory gearbox 32 transfers torque from radial drive shaft 36 to centrifugal compressor 34. Radial drive shaft 36 is coupled to accessory gearbox 32 and extends into bearing compartment 12B (specifically called a high rotor thrust bearing compartment) to couple with and transfer torque from shaft 14B.

Accessory gearbox 32 commonly drives various engine accessories including an electrical generator (not shown) and a main engine oil system, which is used to lubricate components of the engine including the bearings. Accessory gearbox 32 is specifically adapted to drive centrifugal compressor 34, which is disposed within core compartment 38. Scoops or other known devices bleed air at a lower pressure from fan section 18 and/or low pressure compressor section 20. This bleed air is directed to centrifugal compressor 34 where it is compressed to a higher pressure. Thus, lower pressure bleed air directed to the centrifugal compressor 34 can comprise either bypass air AB or primary air Ar or a mixture of both. Primary air Ar can be drawn off various stages of the low pressure compressor section 20 as desired.

Centrifugal compressor 34 operates in a manner known in the art to compress lower pressure bleed air to a higher pressure. Operation of the centrifugal compressor causes a pressure differential that circulates the higher pressure air A to all bearing compartments including forward bearing compartments 12A and 12B and more rearward bearing compartments (FIG. 2) to act as buffer air. In addition to or in alternative to being used as buffer air for the bearing compartments, higher pressure air A can be used as ventilation air to ventilate shaft 14 in a manner know in the art.

A pressure differential between the interior of bearing compartments 12A and 12B and higher pressure air A, along with the configuration of the bearing compartment seals, allows higher pressure air A to migrate across bearing compartment seals into the bearing compartments 12A and 12B. Migration of higher pressure air A across seals helps to prevent the caustic and flammable lubricating oil from leaking out of bearing compartments 12A and 12B. Utilization of centrifugal compressor 34 allows higher pressure A to be compressed to a desired optimal pressure and temperature to provide adequate pressurization to bearing compartments 12A and 12B to prevent oil leakage therefrom. Compressing air A to the desired optimal temperature and pressure eliminates the need for the cooling of air A within a cooler, thereby reducing engine 10 weight and providing more design space within engine 10.

Figure 2:
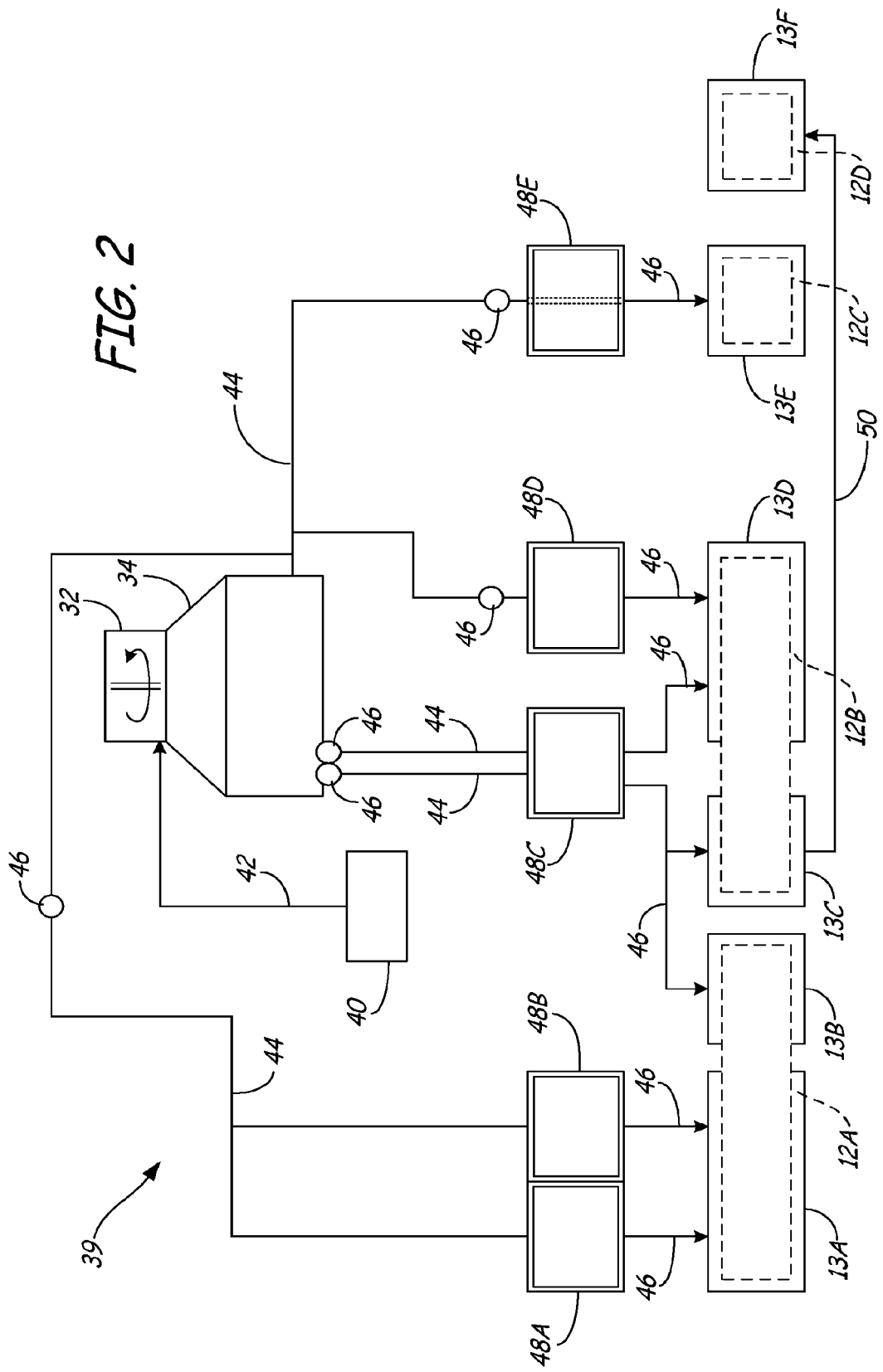
FIG. 2 is a schematic of the buffer and ventilation air system of the gas turbine engine of FIG. 1.

FIG. 2 shows a schematic view of a system 39 that provides buffer air and ventilation air within gas turbine engine 10. System 39 includes a lower pressure location 40, lower pressure external lines or internal passages 42, higher pressure external lines or internal passages 44, metering devices 46, structures 48A-48E, bearing compartments 12A-12D surrounded by seal cavities 13A-13F, and a secondary air flow 50.

Accessory gearbox 32 is coupled to and acts to drive centrifugal compressor 34. Scoops or other known devices bleed air at a lower pressure from lower pressure location 40 within gas turbine engine 10. In one embodiment, location 40 comprises fan section 18 (FIG. 1) and/or low pressure compressor section 20 (FIG. 1). Bleed air is directed as air flow through lower pressure external lines or internal passages 42 to centrifugal compressor 34, which operates to compress the lower pressure bleed air to a higher pressure. The higher pressure air that is compressed in centrifugal compressor 34 circulates away from centrifugal compressor 34 through higher pressure external lines and internal passages 44. Higher pressure air flow branches into several flows that are directed through one or more metering devices 46, such as valves or orifices, which throttle air flow as desired. In the embodiment illustrated in FIG. 2, higher pressure air flow is directed through structures 48A-48E. Structures 48A-48E can variously comprise struts and/or other portions of the front center body, intermediate case, or mid-turbine frame of gas turbine engine 10. Higher pressure air flow passes through structures 48A-48E to provide buffer air to seal cavities 13A-13F that surround bearing compartments 12A-12D and ventilation air to shaft 14 (FIG. 1). In the embodiment shown, secondary air flow 50 continues from seal cavity 13C as ventilation air along the inner diameter of shaft 14A. Secondary air flow 50 also provides buffer air to seal cavity 13F that buffers bearing compartment 12D toward the rear of gas turbine engine 10.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

What is claimed is:

1. A turbine engine comprising:
   a shaft;
   a fan;
   at least one bearing mounted on the shaft and rotationally supporting the fan;
   a fan drive gear system coupled to drive the fan;
   a bearing compartment around the at least one bearing;
   an accessory gearbox located radially outward of a core flow path; and
   a centrifugal compressor driven by the accessory gearbox configured to supply pressurized air to a region surrounding the bearing compartment.

2. The turbine engine as recited in claim 1, wherein the fan drive gear system includes an epicyclic gear train.

3. The turbine engine as recited in claim 2, wherein the epicyclic gear train has a gear reduction ratio of greater than or equal to about 2.3.

4. The turbine engine as recited in claim 2, wherein the epicyclic gear train has a gear reduction ratio of greater than or equal to 2.3.

5. The turbine engine as recited in claim 2, wherein the epicyclic gear train has a gear reduction ratio of greater than or equal to about 2.5.

6. The turbine engine as recited in claim 2, wherein the epicyclic gear train has a gear reduction ratio of greater than or equal to 2.5.

7. The turbine engine as recited in claim 1, wherein the fan defines a bypass ratio of greater than about ten (10) with regard to a bypass airflow and a core airflow.

8. The turbine engine as recited in claim 1, wherein the fan defines a bypass ratio of greater than 10.5:1 with regard to a bypass airflow and a core airflow.

9. The turbine engine as recited in claim 1, wherein the fan defines a bypass ratio of greater than ten (10) with regard to a bypass airflow and a core airflow.

10. The turbine engine as recited in claim 1, wherein the fan defines a pressure ratio that is less than about 1.45.

11. The turbine engine as recited in claim 1, wherein the fan defines a pressure ratio that is less than 1.45.

12. The turbine engine as recited in claim 1, including a core compressor section, and the core compressor section supplies air to the centrifugal compressor.

13. The turbine engine as recited in claim 1, wherein the centrifugal compressor is located radially outward of the core flow path.

14. The turbine engine as recited in claim 1, wherein the bearing compartment is located radially inward of the core flow path.

15. A method of operating a turbine engine, the method comprising:
   in a gas turbine engine that includes a shaft, a fan, at least one bearing mounted on the shaft and rotationally supporting the fan, a fan drive gear system coupled to drive the fan, a bearing compartment around the at least one bearing, an accessory gearbox located radially outward of a core flow path, and a centrifugal compressor driven by the accessory gearbox configured to pressurize air, and providing the pressurized air to a region outside of the bearing compartment to establish a positive pressure differential between the region outside of the bearing compartment and an interior of the bearing compartment.

16. The method as recited in claim 15, wherein the fan drive gear system includes an epicyclic gear train.

17. The method as recited in claim 16, wherein the epicyclic gear train has a gear reduction ratio of greater than or equal to about 2.3.

18. The method as recited in claim 15, wherein the fan supplies bleed air to the centrifugal compressor.

19. The method as recited in claim 15, wherein the centrifugal compressor is located radially outward of the core flow path.

20. The method as recited in claim 15, wherein the bearing compartment is located radially inward of the core flow path.

* * * * *